(12) United States Patent
Suga

(10) Patent No.: US 8,411,623 B2
(45) Date of Patent: Apr. 2, 2013

(54) WIRELESS COMMUNICATION METHOD AND COMMUNICATION APPARATUS

(75) Inventor: Junichi Suga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 620 days.

(21) Appl. No.: 12/356,245

(22) Filed: Jan. 20, 2009

(65) Prior Publication Data

US 2009/0268679 A1    Oct. 29, 2009

(30) Foreign Application Priority Data

Apr. 28, 2008    (JP) ................................ 2008-117864

(51) Int. Cl.
*H04W 4/00*    (2009.01)
(52) U.S. Cl. ...................................................... 370/329
(58) Field of Classification Search ................... 370/329
See application file for complete search history.

(56) References Cited

U.S. PATENT DOCUMENTS

| 2007/0286064 | A1 | 12/2007 | Yu et al. | |
|---|---|---|---|---|
| 2009/0059859 | A1 | 3/2009 | Kuze et al. | |
| 2009/0116435 | A1* | 5/2009 | Koorapaty et al. | 370/329 |
| 2011/0019622 | A1* | 1/2011 | Lee et al. | 370/328 |

FOREIGN PATENT DOCUMENTS

WO    2007/099839    9/2007

OTHER PUBLICATIONS

Korean Intellectual Property Office "Notice of Preliminary Rejection" for corresponding Korean Patent Application No. 10-2009-12341, mailed Jan. 25, 2011. English translation attached.
IEEE Std 802.16/2004, Part 16: Air Interface for Fixed Broadband Wireless Access Systems, Oct. 1, 2004.
IEEE Std 802.16e-2005 and IEEE Std 802.16-2004/Cor1-2005 (Amendment and Corrigendum to IEEE Std 802.16-2004), Part 16: Air Interface for Fixed Broadband Wireless Access Systems, Amendment 2: Physical and Medium Access Control Layers for Combined Fixed and Mobile Operation in Licensed Bands and Corrigendum 1; Feb. 28, 2006.
Cho, Jaeweon et al. "Legacy Support: A Key Design Constraint for 802.16m Frame Structure" Samsung Electronics Co., Ltd & Samsung Advanced Institute of Technology; IEEE 802.16 Presentation Submission Template (Rv.9). Submitted Jan. 21, 2008; URL: http://www.ieee802.org/16/tgm/contrib/C80216m-08_063r1.pdf Retrieved: Jan. 20, 2009.
WiMAX Forum: Mobile WiMAX-Part I: A Technical Overview and Performance Evaluation (Aug. 2006).
KDDI; "Gain of CAZAC Sequence Hopping for ACK/NACK and CQI Signals in PUCCH"; Agenda Item: 6.1.4; 3GPP TSG RAN WG1 Meeting #52; R1-080971; Sorrento, Italy; Feb. 11-15, 2008.
Samsung et al.; "Frequency Hopping Pattern for PUSCH"; Agenda Item: 6.1.5; 3GPP TSG RAN WG1 Meeting #52; R1-081115; Sorrento, Italy; Feb. 11-15, 2008.
Notification of Reason for Rejection issued for corresponding Japanese Application No. 2008-117864, dispatched Nov. 20, 2012, with English translation.

* cited by examiner

*Primary Examiner* — Luat Phung
(74) *Attorney, Agent, or Firm* — Myers Wolin, LLC

(57) ABSTRACT

A wireless communication method for performing wireless communication between a first and second communication apparatus. The method includes: allocating a first subchannel in a first frequency region of a wireless frame to the second communication apparatus when the second communication apparatus performs a first communication, and allocating a second subchannel in a second frequency region of the wireless frame to the second communication apparatus when the second communication apparatus performs a second communication, by the first communication apparatus; and changing physical subchannels within the first frequency region and performing transmission when the first subchannel is allocated to the second communication apparatus, and changing physical subchannels within the second frequency region and performing transmission when the second subchannel is allocated to the second communication apparatus, by the second communication apparatus.

7 Claims, 18 Drawing Sheets

| PARAMETERS | DESCRIPTION |
|---|---|
| UL ALLOCATED SUBCHANNEL BITMAP | SETS SUBCHANNELS ALLOCATED IN 802.16e REGION IN BITMAP FORMAT |
| UL ALLOCATED SUBCHANNEL BITMAP FOR 16m | SETS SUBCHANNELS ALLOCATED IN 802.16m REGION IN BITMAP FORMAT |
| PERMUTATION BASE | SETS SEED VALUE FOR MAPPING OF PHYSICAL SUBCHANNELS AND PHYSICAL SUBCARRIERS. VALUE COMMON TO 802.16e REGION AND 802.16m REGION. |
| UL PUSC SUBCHANNEL ROTATION | SETS EXECUTION OF 802.16e REGION SUBCHANNEL ROTATION |
| UL PUSC SUBCHANNEL ROTATION FOR 16m | SETS EXECUTION OF 802.16m REGION SUBCHANNEL ROTATION |

| PARAMETERS | VALUE |
|---|---|
| UL ALLOCATED SUBCHANNEL BITMAP | 0,1,1, ···,1 |
| UL ALLOCATED SUBCHANNEL BITMAP FOR 16m | 1,0,0, ···,0 |
| PERMUTATION BASE | 10 |
| UL PUSC SUBCHANNEL ROTATION | 1 (ON) |
| UL PUSC SUBCHANNEL ROTATION for 16m | 0 (OFF) |

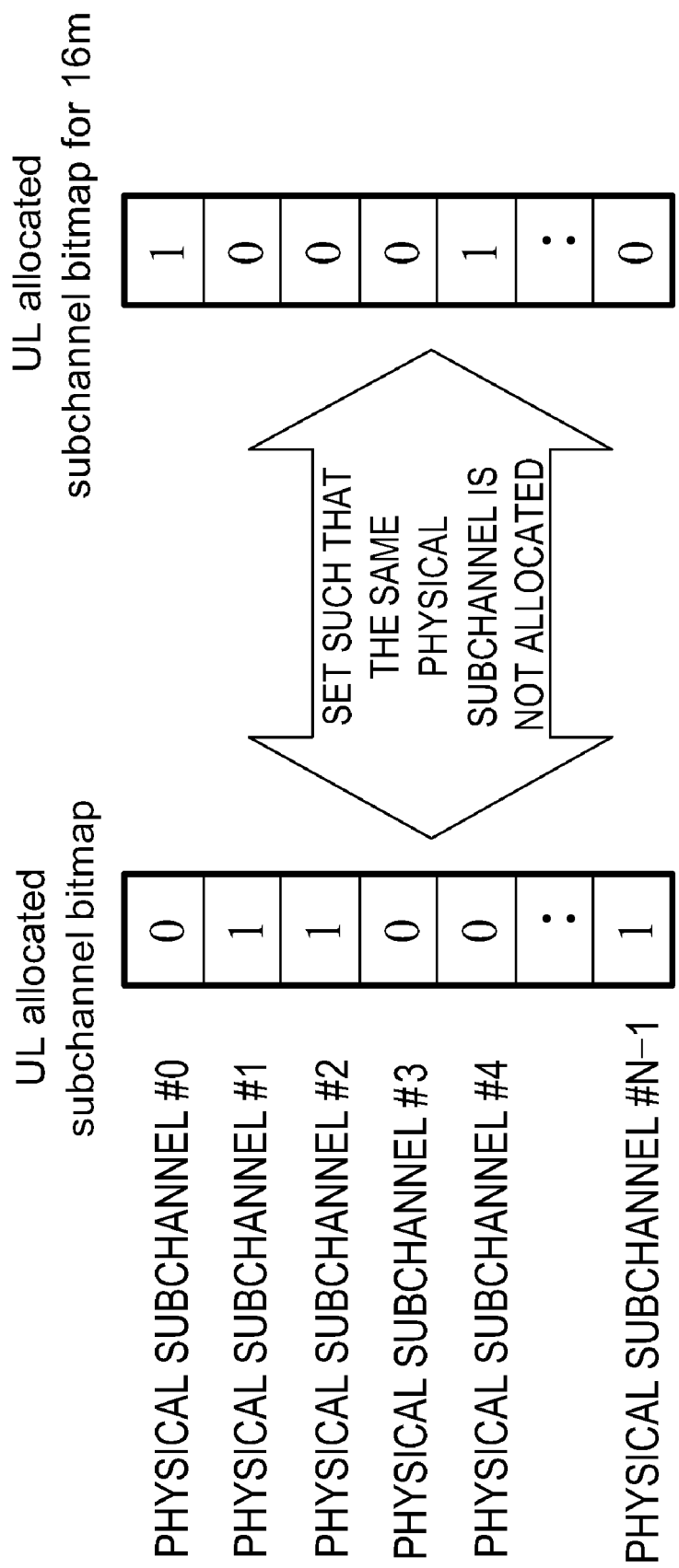

FIG. 5B

| SLOT | | | | |
|---|---|---|---|---|
| 1 | 34 | 32 | 25 | LOGICAL SUBCHANNEL #0 |
| 2 | 1 | 34 | 32 | LOGICAL SUBCHANNEL #1 |
| 5 | 2 | 1 | 34 | LOGICAL SUBCHANNEL #2 |
| ... | ... | ... | ... | |
| 34 | 32 | 25 | 19 | LOGICAL SUBCHANNEL #E−1 ← PHYSICAL SUBCHANNEL NUMBER |

FIG. 5A

UL allocated subchannel bitmap

| 0 | PHYSICAL SUBCHANNEL #0 |
| 1 | PHYSICAL SUBCHANNEL #1 |
| 1 | PHYSICAL SUBCHANNEL #2 |
| 0 | PHYSICAL SUBCHANNEL #3 |
| 0 | PHYSICAL SUBCHANNEL #4 |
| .. | ... |
| 1 | PHYSICAL SUBCHANNEL #N−1 |

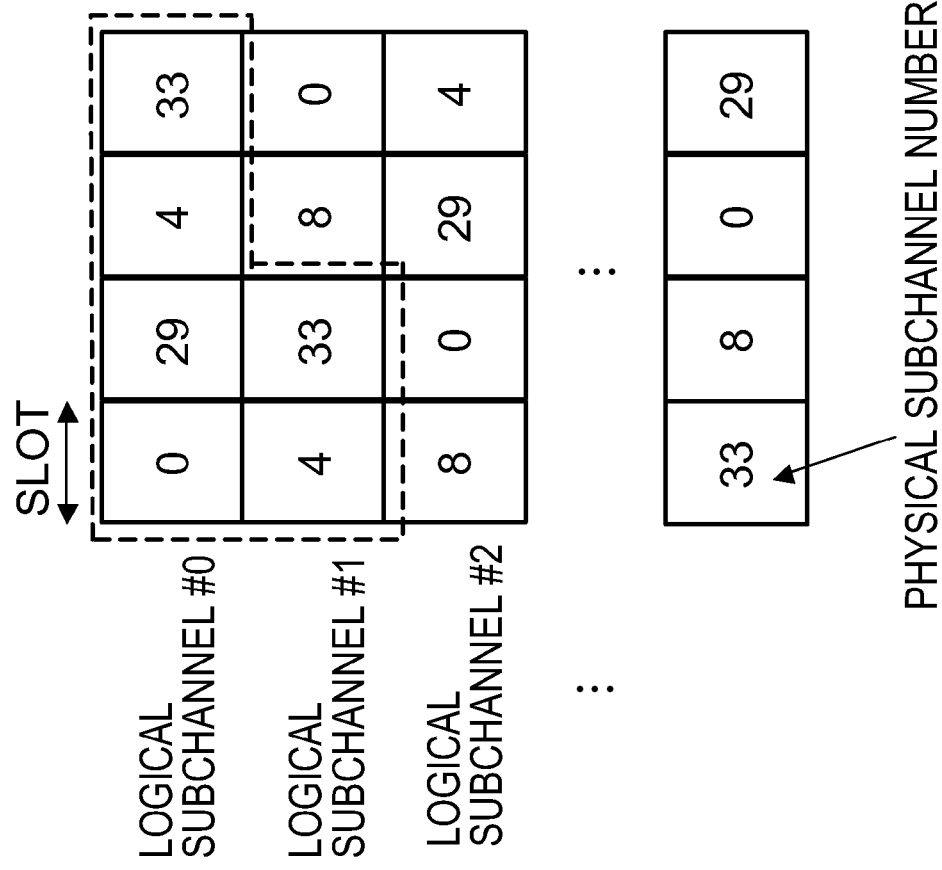

| PARAMETERS | DESCRIPTION |
|---|---|
| UL ALLOCATED SUBCHANNEL BITMAP FOR R3 REGION | SETS SUBCHANNELS ALLOCATED IN R3 REGION IN BITMAP FORMAT |
| UL ALLOCATED SUBCHANNEL BITMAP FOR R1 REGION | SETS SUBCHANNELS ALLOCATED IN R1 REGION IN BITMAP FORMAT |
| PERMUTATION BASE | SETS SEED VALUE FOR MAPPING OF PHYSICAL SUBCHANNELS AND PHYSICAL SUBCARRIERS. VALUE COMMON TO R3 REGION AND R1 REGION |
| UL PUSC SUBCHANNEL ROTATION FOR R3 REGION | SETS EXECUTION OF R3 REGION SUBCHANNEL ROTATION |
| UL PUSC SUBCHANNEL ROTATION FOR R1 REGION | SETS EXECUTION OF R1 REGION SUBCHANNEL ROTATION |

| PARAMETERS | VALUE |
|---|---|
| UL ALLOCATED SUBCHANNEL BITMAP FOR R3 REGION | 0,1,1,···,1 |
| UL ALLOCATED SUBCHANNEL BITMAP FOR R1 REGION | 1,0,0,···,0 |
| PERMUTATION BASE | 10 |
| UL PUSC SUBCHANNEL ROTATION FOR R3 REGION | 0 (OFF) |
| UL PUSC SUBCHANNEL ROTATION FOR R1 REGION | 1 (ON) |

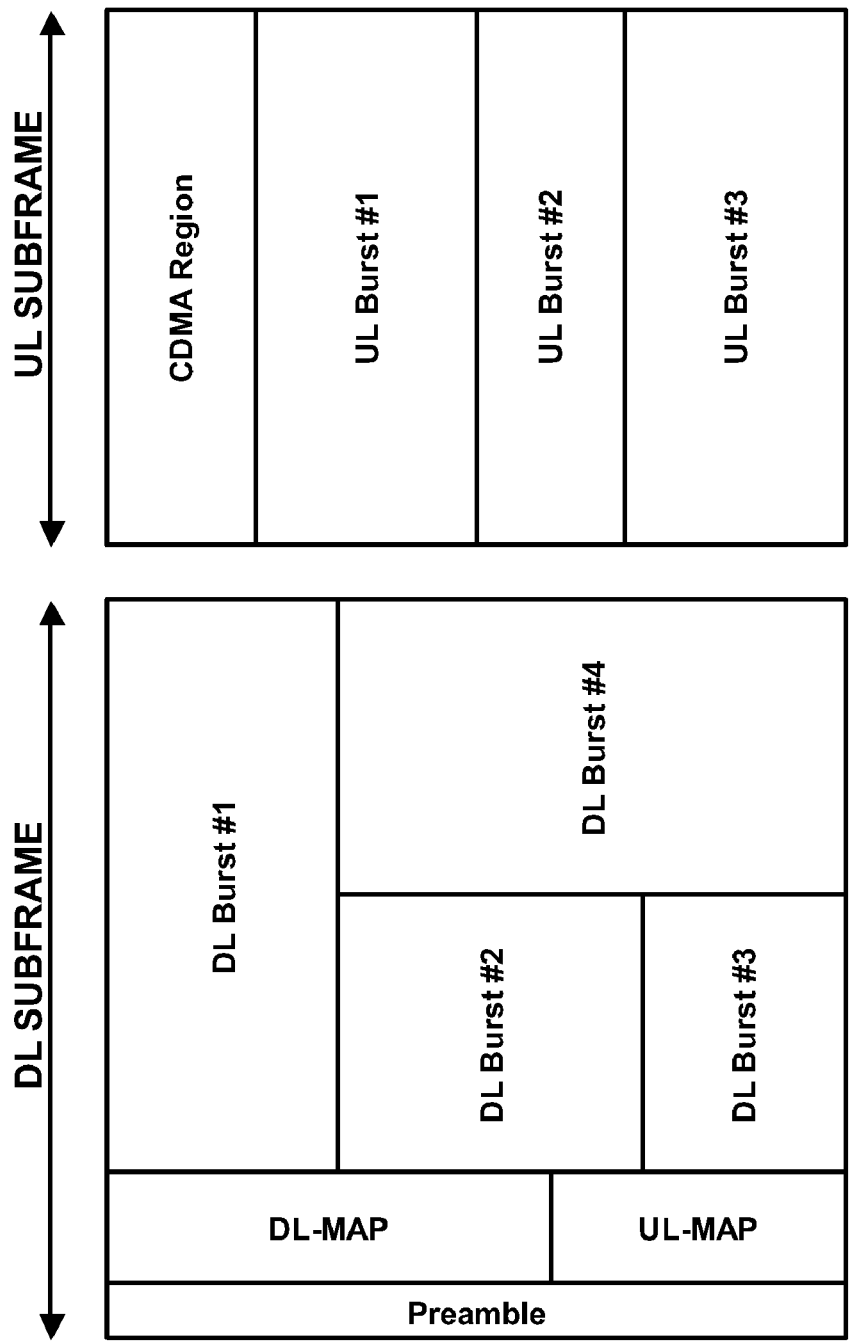

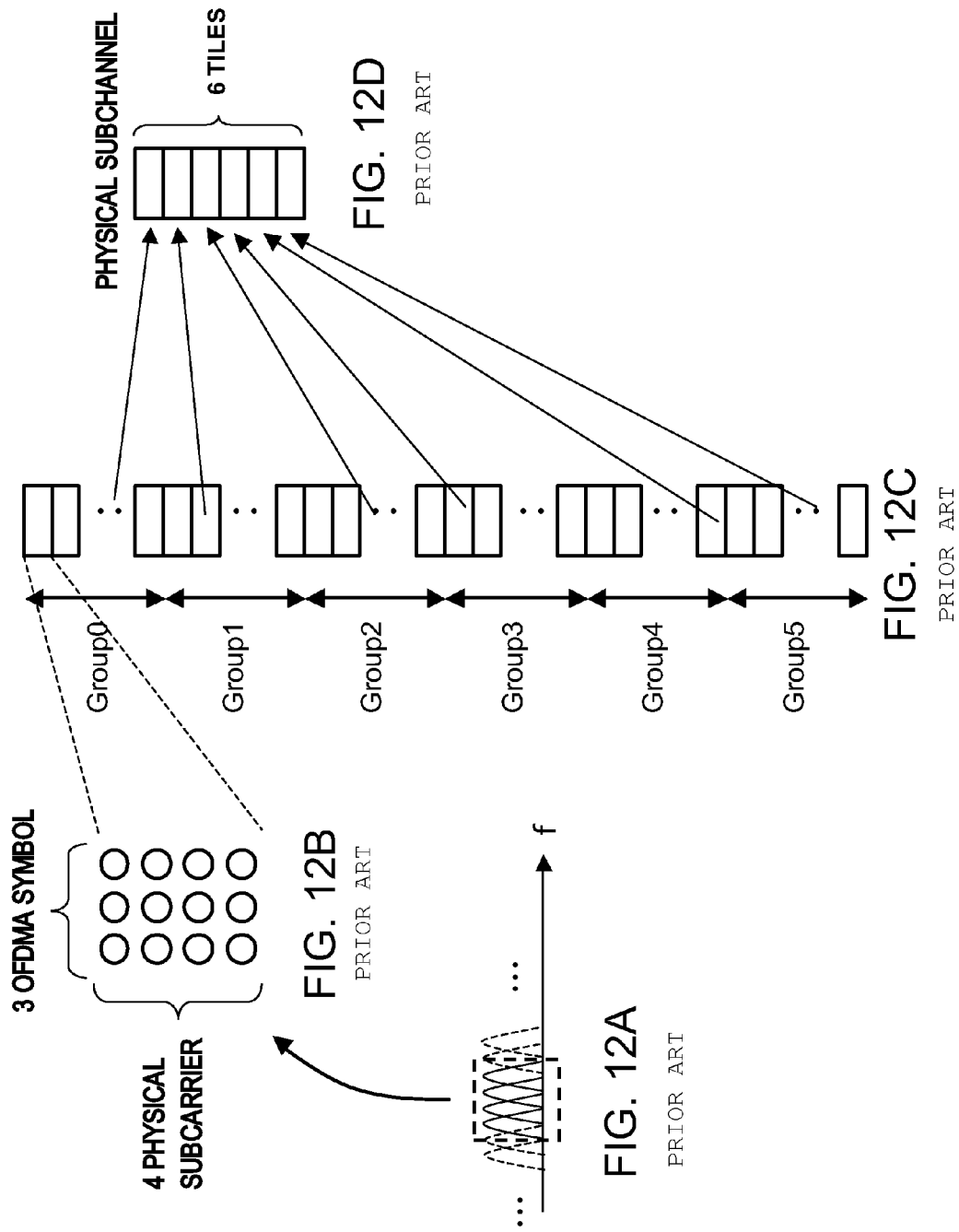

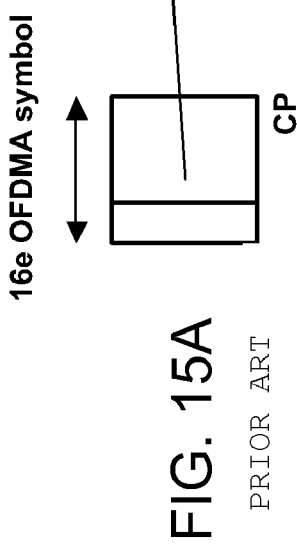
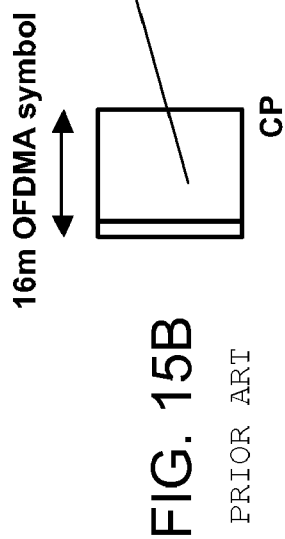
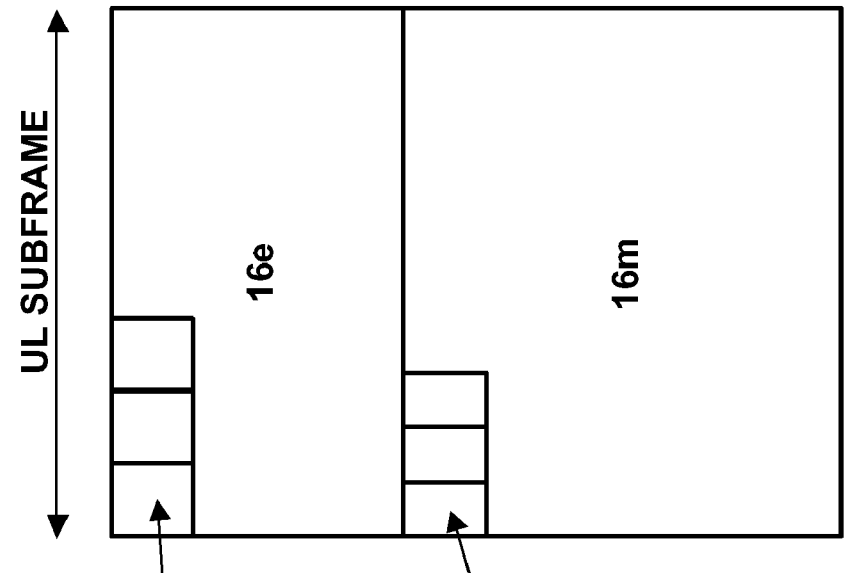
FIG. 15A
PRIOR ART
FIG. 15B
PRIOR ART
FIG. 15C
PRIOR ART

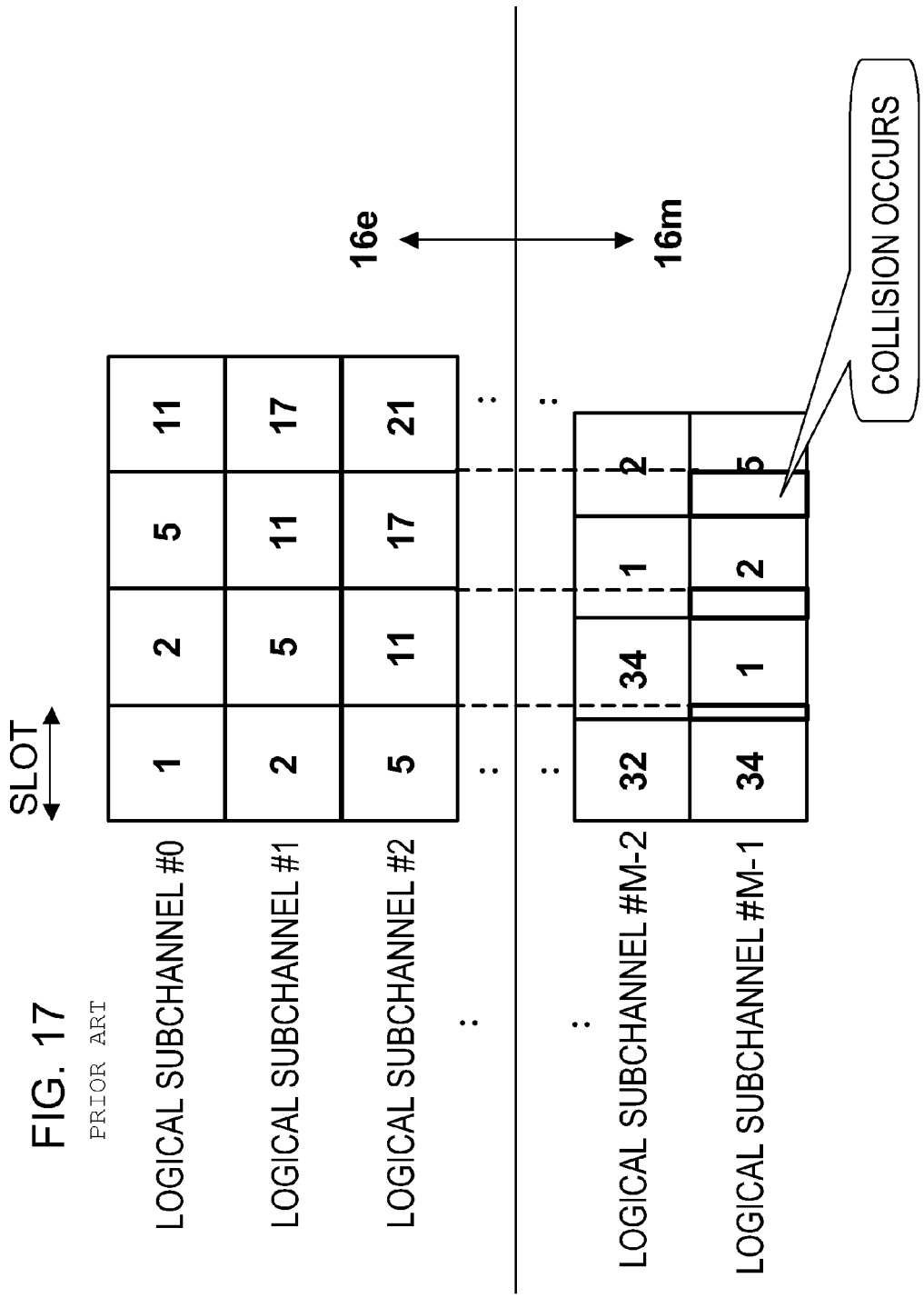

WIRELESS COMMUNICATION METHOD AND COMMUNICATION APPARATUS

CROSS-REFERENCE TO RELATED APPLICATIONS

This application is based upon and claims the benefit of priority of the prior Japanese Patent Application No. 2008-117864, filed on Apr. 28, 2008, the entire contents of which are incorporated herein by reference.

FIELD

The present invention relates to a wireless communication method and to a communication apparatus.

BACKGROUND

The IEEE 802.16 Working Group (WG) is established two standards, one of which, 802.16d, is primarily for using in fixed-line communications, while the other, 802.16e, is for using in mobile communications (see for example IEEE Std. 802.16™-2004 and IEEE Std. 802.16e™-2005).

FIG. 10 shows an example of the frame configuration in 802.16d/e. A base station generates such a frame and transmits the frame to a mobile station. The frame DL/UL-MAP includes DL/UL subframe configuration information and communication control information. By referencing DL/UL-MAP, the mobile station performs DL-direction reception processing and UL-direction transmission processing.

FIG. 11A and FIG. 11B show examples of allocation of physical subchannel to UL subframe in the 802.16e standard. In 802.16e, physical subchannel allocated to the UL subframe is specified in bitmap format ("0" or "1"). In the example of FIG. 11A, physical subchannels #1, #2, . . . , #N−1 are allocated to the UL subframe, and physical subchannels #0, #3, and similar are not used.

Also, in 802.16e, as the method of allocation of physical subcarriers (hereafter "subcarriers") forming physical subchannels, band AMC (Adaptive Modulation Coding) and PUSC (Partial Usage of SubChannels) may be used. In band AMC, adjacent subcarriers on frequencies are mapped to physical subchannels. On the other hand, in PUSC, distributed subcarriers on different frequencies are mapped.

FIG. 12 shows an example of PUSC mapping of physical subchannels and subcarriers. 4 subcarriers×3 OFDMA symbols are taken to be one tile, and one physical subchannel is formed from six distributed tiles. The six tiles forming the physical subchannel may for example be selected using the following formula.

$$\text{Tiles}(s,n) = N\text{subchannels}*n + (Pt[(s+n) \bmod N\text{subchannels}] + UL\_\text{Permbase}) \bmod N\text{subchannels} \quad (1)$$

In equation (1), s is a number of the physical subchannel, n is a tile index value, Nsubchannels is a total number of physical subchannels (when FFT=1024, 35 physical subchannels), Pt[ ] is a permutation matrix, and UL_Permbase is a permutation seed value set by the base station.

By generating such distributed physical subchannels, subcarriers are distributed within UL subframes, and averaged values are assumed for UL subframes as a whole, so that wireless communication quality is improved.

Thereafter, the base station maps the generated physical subchannel to the logical subchannels of UL subframes. With respect to this mapping, the 802.16e standard stipulates application of data subchannel rotation (hereinafter referred to as "subchannel rotation") in PUSC.

FIG. 13 shows an example of mapping when subchannel rotation is applied. Subchannel rotation is a mapping method in which, when a slot (in UL PUSC, one subchannel×3 OFDMA symbols) changes (changes to the next time slot), the mobile station modifies the mapping of physical subchannels and logical subchannels. In the example in the figure, physical subchannels #1, #2, #5, #11 are mapped in order in the time axis direction to the logical subchannel #0, and physical subchannels #2, #5, #11, #17 are mapped to logical subchannel #1. Focusing on physical subchannel #2, in the first slot time physical subchannel #2 is mapped to logical subchannel #1, in the next slot time mapped to logical subchannel #0, and in the next slot time mapped to logical subchannel #M−1. By means of such mapping, the mobile station can use different frequencies in each slot, and immunity to fading is enhanced.

Studies on an 802.16m specification, as a next version of 802.16e, are currently beginning (see for example http://www.ieee802.org/16/tgm/contrib/C80216m-08_063r1.pdf). FIG. 14 shows an example of a frame configuration in 802.16m. Studies are in progress to enable the 802.16m specification to support not only mobile stations conforming to 802.16m, but also mobile stations conforming to 802.16e. As shown in the figure, the UL subframe is divided into two frequency regions, one of which is a transmission region for mobile stations conforming to 802.16e, while the other is a transmission region for mobile stations conforming to 802.16m.

Studies of 802.16m are underway to make an OFDM symbol CP (Cyclic Prefix) region in the UL subframe smaller than in 802.16e. FIGS. 15A to 15C illustrate an example of the relations between OFDMA symbols and UL subframes. 802.16m can reduce the CP region, so that the number of OFDMA symbols arranged in one frame can be increased, and the volume of data which can be transmitted can be increased.

On the other hand, in the WiMAX Forum, FFR (Fractional Frequency Reuse) is proposed as the mode of utilization of frequency bands based on 802.16d/e (see for example "Mobile WiMAX—Part I: A Technical Overview and Performance Evaluation" (August 2006)). FIG. 16 shows an example of an UL subframe configuration in FFR. In FFR, for example, the UL subframe is divided in two regions in the frequency axis direction, with one a frequency region which is different from that of adjacent base stations (R3 region), and the other a frequency region which is the same for adjacent base stations (R1 region). The mobile station at a cell edge is allocated to frequency region in the R3 region, and mobile station near base stations is allocated to frequency region in the R1 region. By this means, efficiency of frequency utilization is improved and coverage is expanded.

However, if the PUSC (FIGS. 12A to 12D) and subchannel rotation (FIG. 13) stipulated in 802.16e are applied to the UL subframes of the above-described 802.16m (FIG. 14), due to shifting of the starting position of time-axis slots, in some cases there occur time bands in which the same frequency is used by different mobile stations subordinate to the same base station at the same time.

FIG. 17 is used to explain this situation. As shown in the figure, when the mobile station conforming to 802.16e uses the frequency band of physical subchannel #1 in the initial slot time, there is a time band in which the mobile station conforming to 802.16m uses the frequency band of the same physical subchannel #1. In such a case, two different mobile stations are using the same subcarrier in the same time band, and physical subchannels collide. Due to such physical subchannel collision, deterioration of the base station reception characteristics and other problems with deterioration of wireless communication quality occur.

Further, when PUSC and subchannel rotation are applied to FFR UL subframe, a similar problem of collision of physical subchannels used by adjacent base stations occurs. This is because subchannel rotation is performed for UL subframe overall by the base station and by the adjacent base station, so that there are cases in which the same physical subchannels are mapped in the same time bands in each of the R3 regions of the base station and adjacent base station. Due to physical subchannel collision, a portion of the R3 region allocated to the mobile station on the cell edge is used by a mobile station of the adjacent base station in the same time band, so that the base station receives interference from the mobile station of the adjacent base station. In this case also, physical subchannel collision causes deterioration of wireless communication quality.

In other wireless communication methods also, similar problems can occur when physical subchannel modifications are performed.

SUMMARY

Hence, one aspect of the present invention is to provide a wireless communication method and communication apparatus which avoid physical subchannel collision.

According to one aspect of the present invention, a wireless communication method for performing wireless communication between a first communication apparatus and a second communication apparatus, the wireless communication method including the steps of: allocating a first subchannel in a first frequency region of a wireless frame to the second communication apparatus, when the second communication apparatus performs a first communication, and allocating a second subchannel in a second frequency region of the wireless frame to the second communication apparatus, when the second communication apparatus performs a second communication, by the first communication apparatus; and changing physical subchannels within the first frequency region and performing transmission, when the first sunchannel is allocated to the second communication apparatus, and changing physical subchannels within the second frequency region and performing transmission, when the second subchannel is allocated to the second communication apparatus, by the second communication apparatus, wherein the first frequency region and the second frequency region are set so as not to have frequency overlap.

By means of the present invention, physical subchannel collisions can be avoided.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 3A and FIG. 3B show examples of parameters stored in a storage unit;

FIG. 4A and FIG. 4B show examples of UL subframe allocation information;

FIG. 5A and FIG. 5B show examples of mapping by data subchannel rotation;

FIG. 6A and FIG. 6B show examples of mapping by data subchannel rotation;

FIG. 9A and FIG. 9B show examples of parameters stored in a storage unit;

FIG. 10A and FIG. 10B show examples of the configuration of a DL subframe and a UL subframe respectively;

FIGS. 12A to 12D are used to explain PUSC examples;

FIGS. 15A to 15C show the relation between OFDMA symbols and UL subframes;

DESCRIPTION OF EMBODIMENT(S)

Figure 1:
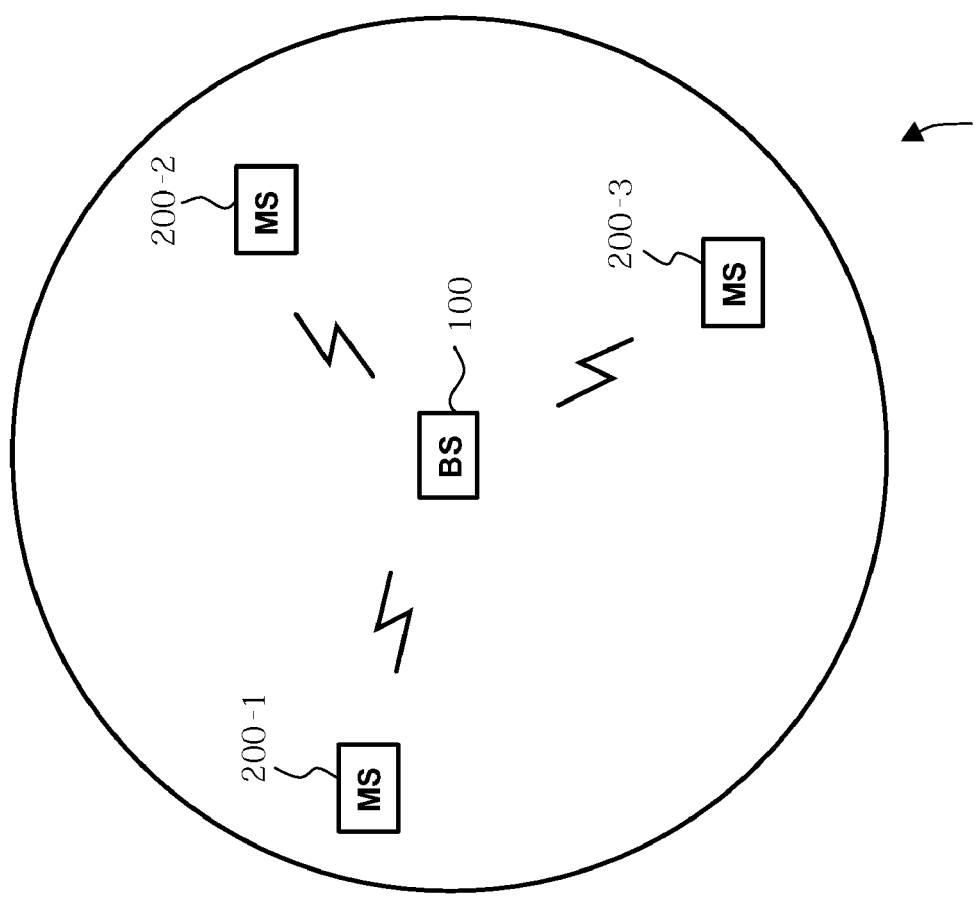
FIG. 1 shows an example of the configuration of a wireless communication system.

Below, best modes of carrying out the present invention are explained, referring to the drawings.

A first communication apparatus, when a second communication apparatus is performing a first communication, allocates a first subchannel within a first frequency region of a wireless frame to the second communication apparatus, and when the second communication apparatus is performing a second communication, allocates a second subchannel within a second frequency region of a wireless frame to the second communication apparatus. Here, the first frequency region and second frequency region are such that there are no overlapping frequencies.

Then, when the first subchannel is allocated, the second communication apparatus modifies the physical subchannel within the first frequency region and performs transmission, and when the second subchannel is allocated, the second communication apparatus modifies the physical subchannel within the second frequency region and performs transmission. By this means, even when subchannel rotation is performed, overlapping of subchannels used between the first communication and the second communication can be avoided.

First Embodiment

A first embodiment is explained. FIG. 1 shows an example of the configuration of a wireless communication system 10, showing a service image example. The wireless communication system 10 has a base station apparatus (hereafter "base station") 100, and a plurality of mobile station apparatuses (hereafter "mobile station") 200-1 to 200-3. The wireless communication system 10 is based on P-MP (Point-to-Multipoint) connections, in which the single base station 100 is connected to the plurality of mobile stations 200-1 to 200-3.

Figure 2A:
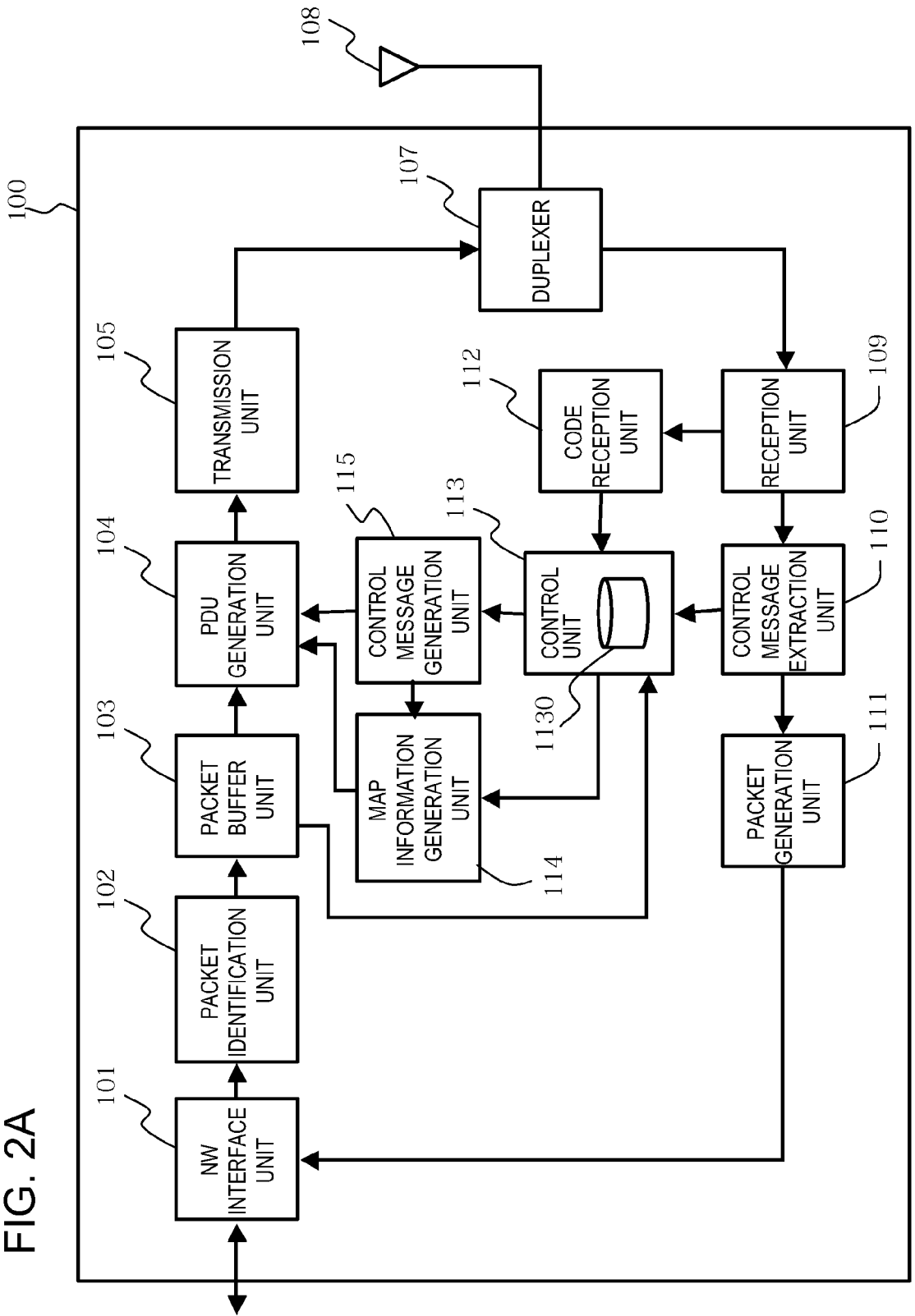
FIG. 2A shows an example of the configuration of a base station.

FIG. 2A shows an example of the configuration of the base station 100. The base station 100 has a NW (Network) interface unit 101, packet identification unit 102, packet buffer unit 103, PDU (Protocol Data Unit) generation unit 104, transmission unit 105, duplexer 107, antenna 108, reception unit 109, control message extraction unit 110, packet generation unit 111, code reception unit 112, control unit 113, MAP information generation unit 114, and control message generation unit 115.

The NW interface unit 101 is connected via a wire network to other base stations or similar, and serves as an interface between the wire network and base station.

The packet identification unit 102 identifies the packet destination (mobile station), data type, and similar of a packet sent to the mobile station 200 subordinate to the base station 100. The identification unit 102 outputs the acquired packet to the packet buffer unit 103 based on the identified destination and data type.

The packet buffer unit 103 holds packets to be sent to the mobile stations 200.

The PDU generation unit 104 generates PDU data to be transmitted in wireless frames to mobile stations 200.

The transmission unit 105 performs encoding processing and modulation processing of PDU data, and generates transmission signals for transmission to the mobile stations 200.

The duplexer 107 outputs transmission signals from the transmission unit 105 to the antenna 108, and outputs received signals received by the antenna 108 from mobile stations 200 to the reception unit 109. The transmission signals are wirelessly transmitted to subordinate mobile stations 200 from the antenna 108.

The reception unit 109 performs demodulation processing and decoding processing of received signals from the duplexer 107, and separates data and control signals (CDMA codes, ACK/NACK, and similar) from the received signals. The reception unit 109 outputs data to the control message extraction unit 110 and control signals to the code reception unit 112.

The control message extraction unit 110 extracts control messages contained in data from the reception unit 109, and outputs the control messages to the control unit 113. The control message extraction unit 110 also outputs data other than control messages to the packet generation unit 111.

The packet generation unit 111 generates packets for transmission to the wire network from data from the control message extraction unit 110, and outputs the packets to the NW interface unit 101.

The code reception unit 112 receives control signals through the input of control signals from the reception unit 109, and outputs the control signals to the control unit 113.

The control unit 113 executes scheduling processing based on the state of packets held by the packet buffer unit 103 and control information (control signals from the code reception unit 112, and control messages from the control message extraction unit 110), and based on the results, controls the MAP information generation unit 114 and control message generation unit 115. The control unit 113 has a storage unit 1130, reads information stored in the storage unit 1130, and outputs the information to the control message generation unit 115.

Figures 14A, 14B:
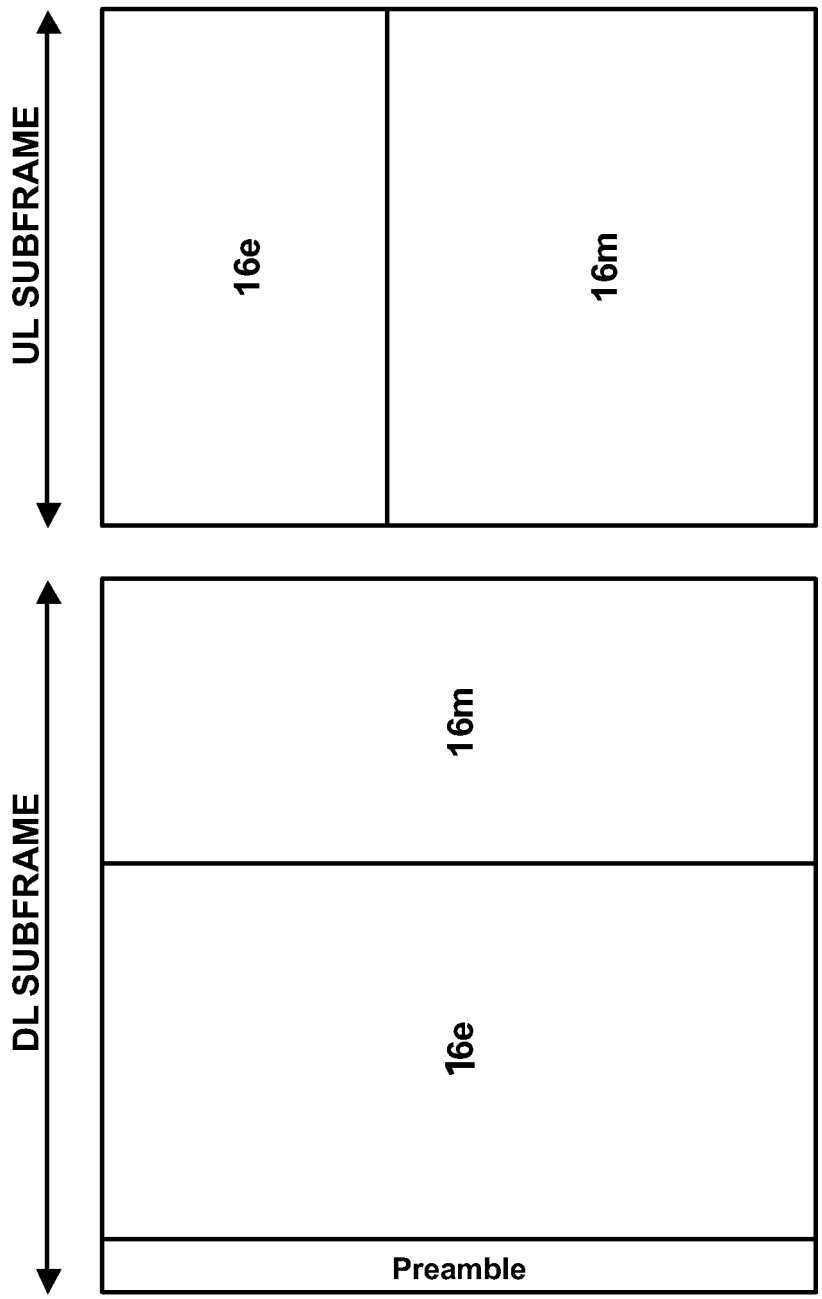
FIG. 14A and FIG. 14B show examples of the configuration of a DL subframe and a UL subframe respectively.

The MAP information generation unit 114 generates DL-MAP and UL-MAP information (frame configuration information) based on instructions from the control unit 113. In this embodiment, the MAP information generation unit 114 generates each of MAPs such that a frame includes two regions, which are a region allocated to mobile stations conforming to 802.16e (hereafter "802.16e region"), and a region allocated to mobile stations conforming to 802.16m (hereafter "802.16m region") (see FIG. 14A and FIG. 14B). DL subframe is divided into two regions in the time axis direction, and UL subframe is divided into two regions in the frequency axis direction.

The control message generation unit 115 generates control messages for subordinate mobile stations 200, and outputs the control messages to the PDU generation unit 104 and MAP information generation unit 114. The control message generation unit 115 generates UCD (Uplink Channel Descriptor) messages containing information stored in the storage unit 1130, and outputs the UCD messages to the PDU generation unit 104. The UCD message is a message which is transmitted to all mobile stations 200 connected to the base station 100, and includes information relating to communication in the uplink (UL) direction. Based on this information, the mobile stations 200 perform transmission of control signals, control messages, and data to the base station 100.

Figure 2B:
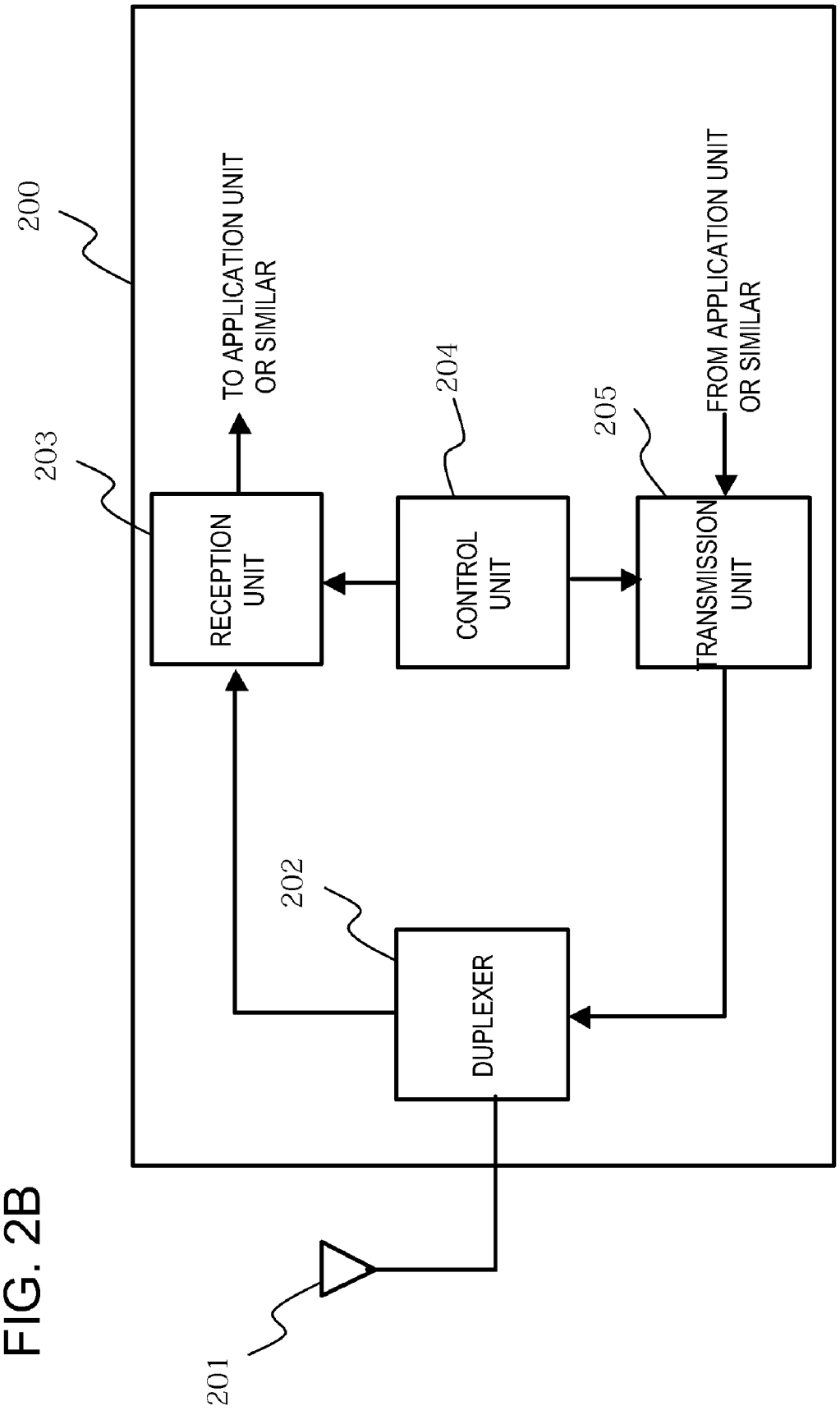
FIG. 2B shows an example of the configuration of a mobile station.

FIG. 2B shows an example of the configuration of the mobile station 200. The mobile station 200 has an antenna 201, duplexer 202, reception unit 203, control unit 204, and transmission unit 205. The reception unit 203 receives reception signals via the antenna 201 and duplexer 202. The reception unit 203 outputs control messages included in the received signal, for example, UCD message or similar, to the control unit 204, and outputs data included in the received signal to an application unit or similar. The control unit 204 controls the transmission unit 205 based on received control messages. The transmission unit 205 generates transmission signals, and transmits the transmission signal to the base station 100 via the duplexer 202 and antenna 201. The control unit 204 executes the above described subchannel rotation, when information indicating execution of subchannel rotation is included in the UCD message. When executing subchannel rotation, the control unit 204 changes physical subchannels included in logical subchannel allocated by the base station 100, and controls the transmission unit 205 so as to transmit transmission signals based on the rotated physical subchannel.

Next, information stored in the storage unit 1130 of the base station 100 is explained. FIG. 3A and FIG. 3B show examples of information stored in the storage unit 1130.

The storage unit 1130 stores in advance UL subchannel allocation information ("UL allocated subchannel bitmap" and "UL allocated subchannel bitmap for 16m"); permutation information ("permutation base"); and information indicating whether subchannel rotation is to be executed or not ("UL PUSC subchannel rotation" and "UL PUSC subchannel rotation for 16m").

The "UL allocated subchannel bitmap" is a parameter, in bitmap format, indicating physical subchannel allocated in the 802.16e region of the UL subframe. As shown in FIG. 3B, when the parameter values are "0, 1, 1, . . . ", the first physical subchannel is not allocated to the 802.16e region, while the second and third physical subchannels are allocated to the 802.16e region.

The "UL allocated subchannel bitmap for 16m" is a parameter, in bitmap format, indicating physical subchannel allocated in the 802.16m region of the UL subframe. As shown in FIG. 3B, when the parameter values are "1, 0, 0, . . . ", the first physical subchannel is allocated to the 802.16m region, and the second and third physical subchannels are not allocated to the region.

The "permutation base" is a parameter indicating a seed value for mapping of physical subchannel and physical subcarrier. In this embodiment, the value is used in common for the 802.16e region and the 802.16m region. The reason for this is explained below.

The "UL PUSC subchannel rotation" is a parameter indicating whether subchannel rotation is to be executed in the 802.16e region, or not. For example, as indicated in FIG. 3B, when the value of this parameter is "1", subchannel rotation in the mobile station 200 is executed (ON), and when it is "0", rotation is not executed (OFF).

The "UL PUSC subchannel rotation for 16m" is a parameter indicating whether subchannel rotation is to be executed in the 802.16m region, or not. An example is shown in FIG. 3B.

The control message generation unit 115 generates UCD messages including these information, and transmits the messages to the mobile stations 200.

FIG. 4A and FIG. 4B show an example of UL subchannel allocation information stored in the storage unit 1130. As is shown in these figures, the physical subchannel allocated to the 802.16e region of the UL subframe ("UL allocated subchannel bitmap"), and the physical subchannels allocated to the 802.16m region ("UL allocated subchannel bitmap for 16m"), are set so as to be exclusive, so that the same physical subchannel cannot be allocated to both.

By this means, different physical subchannels are allocated to the mobile station 200 conforming to 802.16e which uses the resources of the 802.16e region, and to the mobile station 200 conforming to 802.16m which use the resources of the 802.16m region, respectively. Hence even when two mobile stations 200 each execute subchannel rotation, because the used physical subchannels (or used subcarriers) are mutually different, physical subchannel collision between two mobile stations 200 can be avoided. As a result, wireless communication quality is improved.

The control unit 113 of the base station 100 allocates 802.16e region resources when the mobile station 200-1 performs communication conforming to 802.16e, and allocates 802.16m region resources when the mobile station 200-2 performs communication conforming to 802.16m. These wireless frames are transmitted under control of the control unit 113 from the MAP information generation unit 114. As explained above, when the mobile station 200-1 conforming to 802.16e and the mobile station 200-2 conforming to 802.16m execute subchannel rotation, these mobile stations 200-1, and 200-2 modify physical subchannels within the logical subchannels in each of the allocated regions, and performs communication to the base station 100.

FIG. 5A and FIG. 5B show examples of mapping of physical subchannel and logical subchannel in cases in which subchannel rotation is executed in the 802.16e region. As explained above, the subchannel rotation is executed by the control unit 204 of the mobile station 200.

As shown in FIG. 5A, physical subchannels used in the 802.16e region are the physical subchannels #1, #2, . . . , #N−1; in the 802.16e region, these physical subchannels are used to execute subchannel rotation.

As explained above, the control message generation unit 115 of the base station 100 transmits the UCD message including information instructing execution of the subchannel rotation (see FIG. 3A and FIG. 3B) to the mobile station 200, and by this means the base station 100 issues instructions to the mobile station 200, and the mobile station 200 execute subchannel rotation.

The mobile station 200 executes subchannel rotation in the following manner. First, physical subchannel is arranged in ascending order of the physical subchannel number used, and logical subchannel numbers are assigned to each physical subchannel in order, with the logical subchannel number #0 assigned to the leading physical subchannel, the logical subchannel number #1 assigned to the physical subchannel with the next number, and so on.

Then, in the next time-axis slot, the following formula is used to perform mapping of physical subchannels and logical subchannels.

(next-slot logical subchannel number)={(current logical subchannel number)+(number of physical subchannels)×A−13} mod(number of physical subchannels)     (2)

Here, A is the smallest integer for which {(current logical subchannel number)+(number of physical subchannels)×A−13} is 0 or greater.

The above processing is executed by the mobile station 200 to execute data subchannel rotation. The dashed line in FIG. 5B is an example of a resource block allocated to a certain mobile station 200.

On the other hand, FIG. 6A and FIG. 6B show examples of physical subchannel and logical subchannel mapping in a case in which subchannel rotation is executed in the 802.16m region. As is understood by comparing FIG. 6B with FIG. 5B, because physical subchannel is set exclusively, even when subchannel rotation is executed, the physical subchannel used is different.

Here, the reason for using the common value for the "permutation base" (see FIG. 3A) in the 802.16e region and in the 802.16m region is explained. The "permutation base" corresponds to "UL_Permbase" in the above equation (1). If the "permutation base" is altered, the number of the subcarrier to which each physical subchannel is allocated changes. As a result, even though physical subchannel is set exclusively in the 802.16e and 802.16m regions and different physical subchannels are used in each region, there is the possibility that the same subcarrier may be used in each region. Hence in this embodiment, the same value of the "permutation base" is used in the two regions, so that the subcarrier mapped to physical subchannel is the same in the 802.16m region and in the 802.16e region.

Figure 7:
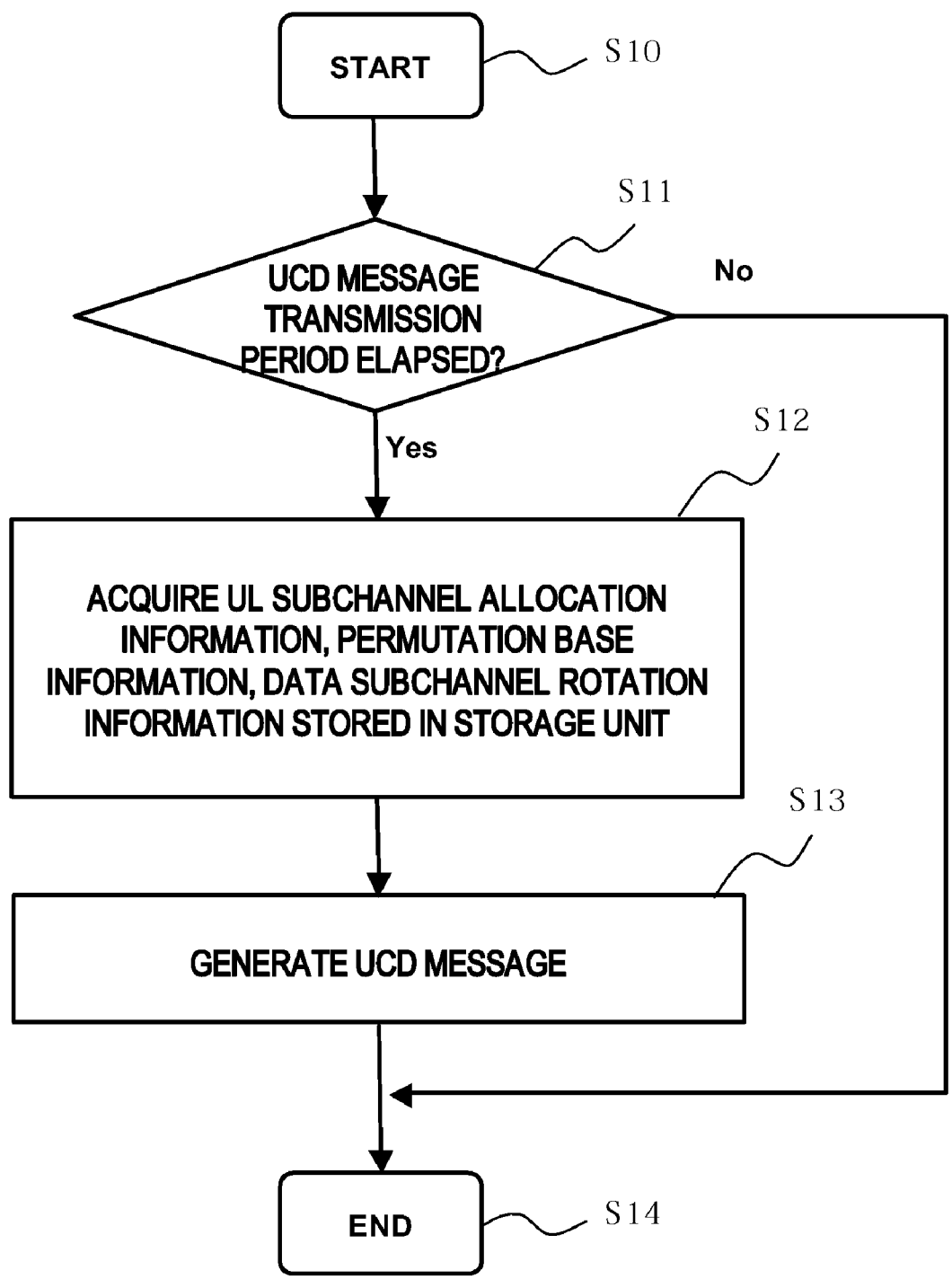
FIG. 7 is a flowchart showing an example of UCD message transmission processing.

FIG. 7 shows an example of a flowchart to generate UCD message including UL subchannel allocation information and similar. When processing starts (S10), the control unit 113 judges whether the UCD message transmission period is elapsed or not (S11). The control unit 113 makes this judgment based on MAP information generated by the MAP information generation unit 114, for example.

If the UCD message transmission period is not elapsed (No in S11), the base station 100 ends the series of processing (S14).

On the other hand, if the UCD message transmission period is elapsed (Yes in S11), the control message generation unit 115 acquires UL subchannel allocation information stored in the storage unit 1130, permutation information, and subchannel rotation information from the control unit 113 (S12).

Next, the control message generation unit 115 generates the UCD message including these information (S13), and the series of processing ends (S14).

Figure 8:
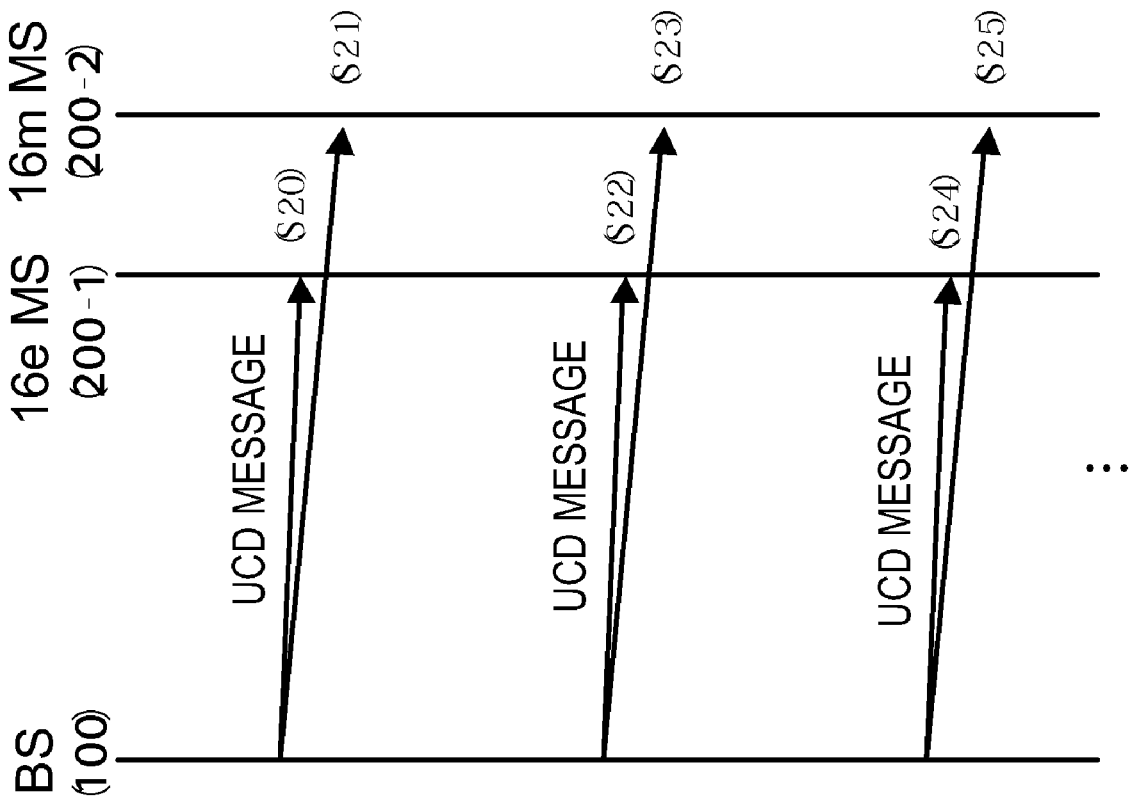
FIG. 8 shows an example of a UCD message transmission sequence.
Figures 11A, 11B:
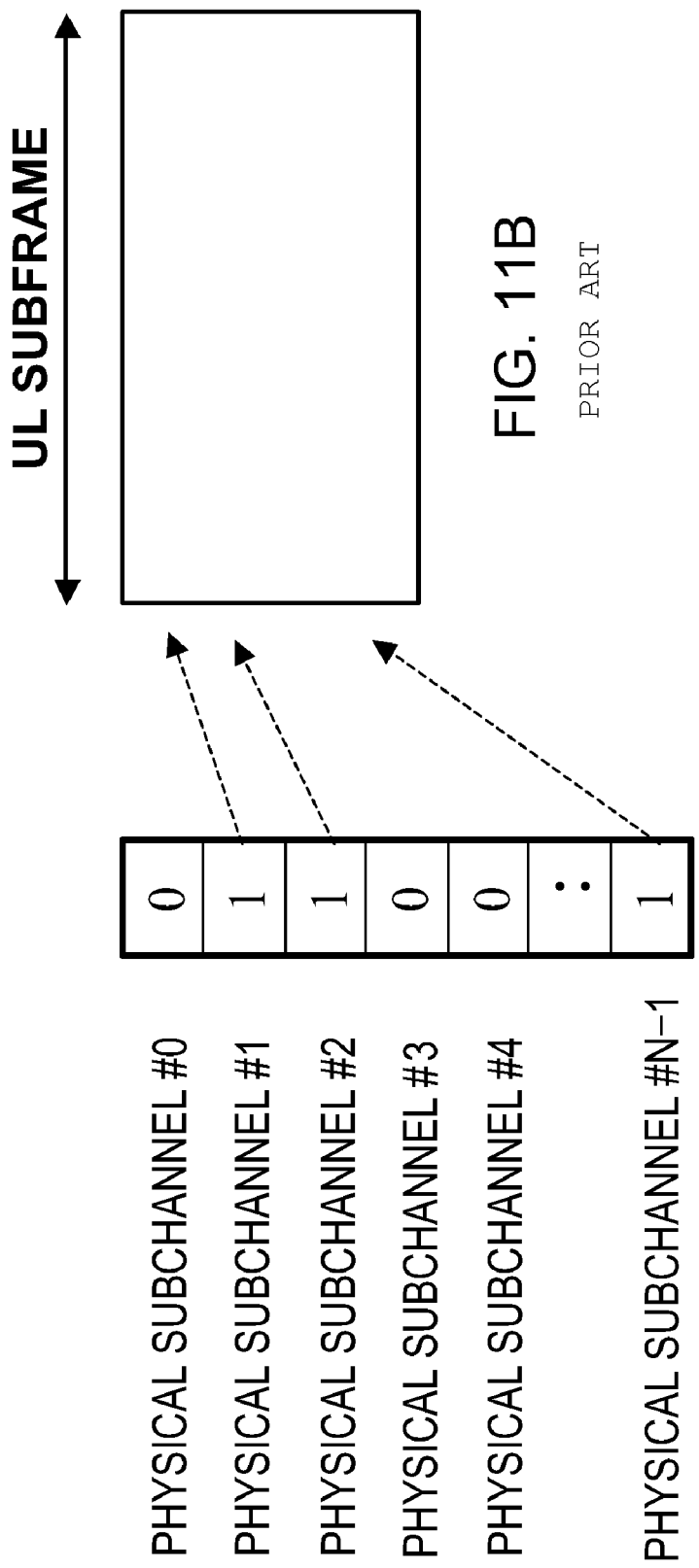
FIG. 11A and FIG. 11B show examples of physical subchannels allocated to UL subframes.
Figure 13:
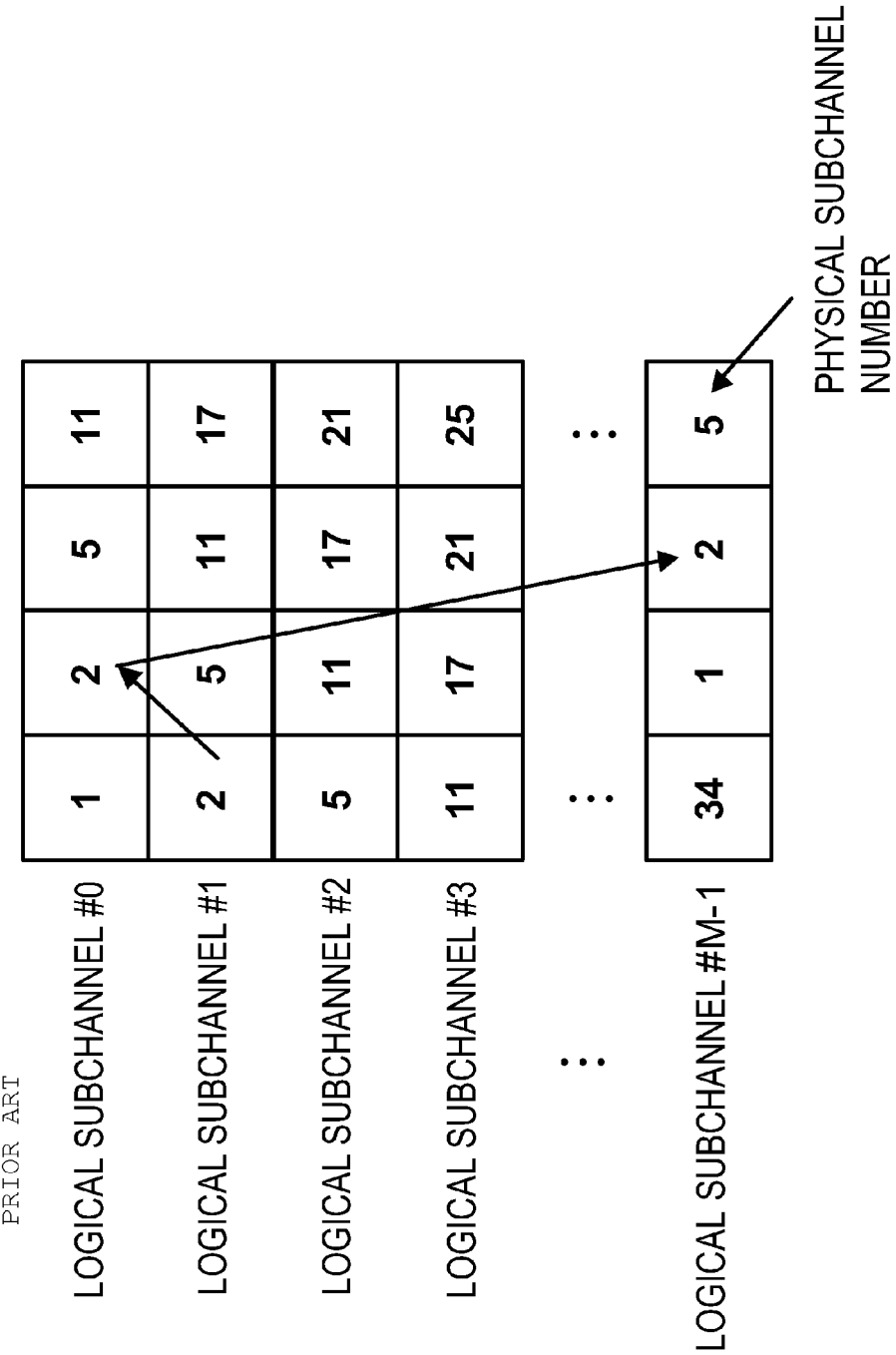
FIG. 13 shows an example of mapping by data subchannel rotation.

FIG. 8 shows an example of a sequence for transmission of the UCD message from the base station 100 to two subordinate mobile stations 200-1 and 200-2. The base station 100 transmits UCD messages including information stored in the storage unit 1130 to the mobile station 200-1 conforming to 802.16e, and to the mobile station 200-2 conforming to 802.16m (S20 to S25).

By this means, the mobile station 200-1 uses 802.16e region resource to perform UL-direction communication with the base station 100, and the mobile station 200-2 uses 802.16m region resource to perform UL-direction communication. The mobile stations 200-1 and 200-2 execute PUSC, and based on information included in the UCD messages, execute subchannel rotation and other processing.

When information is included in the UCD message indicating that subchannel rotation is not to be executed (for example, when "UL PUSC subchannel rotation" is "0"), the mobile station 200 does not execute data subchannel rotation. In this case, physical subchannel allocated in the initial slot time are mapped to each of the logical subchannels. For example in the example of FIG. 5A, the physical subchannel #1 is mapped to all slots of the logical subchannel #0, and the physical subchannel #2 is mapped to all slots of the logical subchannel #1. In this case, different physical subchannels are used in different time-axis slots for the two regions, so that physical subchannel collision problems do not occur.

In this first embodiment, an example is explained in which the UL subframe is divided into two regions (an 802.16e region and an 802.16m region). Similar execution is possible in cases of division into three, four, or another number of regions as well. In these cases, UL subchannel allocation information, and information indicating whether to execute subchannel rotation or not, are stored, corresponding to each of the divided region, in the storage unit 1130. The base station 100 transmits the UCD message including these information to each of the mobile stations 200.

Second Embodiment

Below, a second embodiment is explained. This second embodiment is an example in which FFR is applied. The configuration of the base station 100 (FIG. 2A and similar) and processing (FIG. 7 and FIG. 8 and similar) are the same.

Figure 16B:
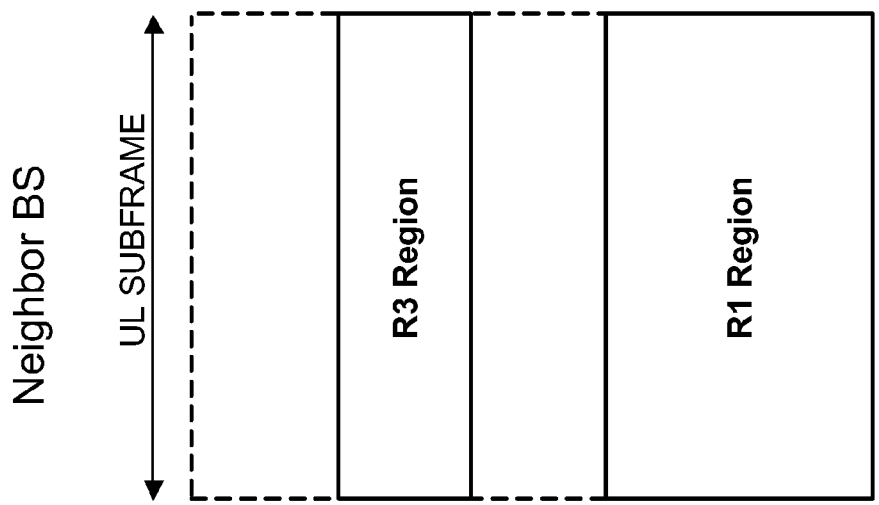
FIG. 16A and FIG. 16B show examples of the configuration of FFR UL subframes; and, FIG. 17 shows the occurrence of physical subchannel collision.
Figure 16A:
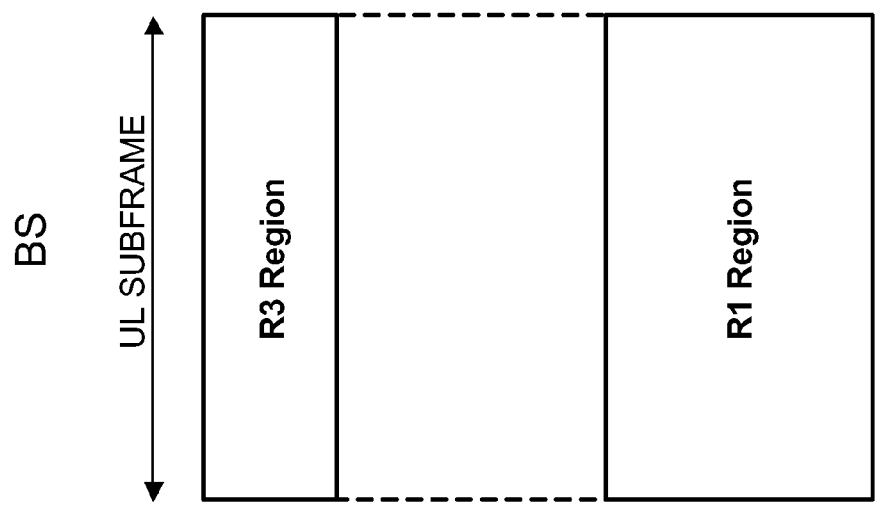

FIG. 9A and FIG. 9B show examples of information stored in the storage unit 1130. An example of UL subframe of FFR shows in FIG. 16A and FIG. 16B. For example, under control by the control unit 113, the MAP information generation unit 114 generates the UL subframe.

As shown in FIG. 9A, an "UL allocated subchannel bitmap for R3 Region" and "UL allocated subchannel bitmap for R1 Region", which are UL subchannel allocation information, are parameters in bitmap format ("0" or "1") indicating the numbers of physical subchannels mapped to the R3 region or R1 region of the UL subframes. Also, an "UL PUSC subchannel Rotation for R3 Region" and "UL allocated subchannel bitmap for R1 Region" are parameters indicating whether data subchannel rotation is to be executed or not in the R3 region and in the R1 region respectively. The "Permutation base" is similar to that in the first embodiment.

The control unit 113 reads this information stored in the storage unit 1130, and outputs the information to the control message generation unit 115; the control message generation unit 115 generates an UCD message including these information, and transmits the UCD message to the mobile stations 200 (see FIG. 7 and FIG. 8). Processing is similar to that in the first embodiment.

Thus in this second embodiment, physical subchannels are set exclusively such that different physical subchannels are mapped in the R3 region and in the R1 region of the UL subframe. And, when subchannel rotation is executed by each of the mobile stations 200, execution is performed in each of the R3 and the R1 regions.

As explained above, when PUSC and subchannel rotation are applied to the entire UL subframe, even when for example a physical subchannel different from that of an adjacent base station is mapped in the R3 region in the leading slot time, there are cases in which, in the next slot time, the same physical subchannel as in the adjacent base station is mapped. In this second embodiment, exclusive physical subchannel mapping in the R3 region and R1 region is performed, and moreover data subchannel rotation is executed in each of the R3 region and R1 region, so that subcarrier collision problems do not occur, and the wireless communication quality can be improved.

In this second embodiment also, similarly to the first embodiment, the common value for the "Permutation base" is used in the R3 region and in the R1 region. This is to avoid subcarrier collision in the two regions, and to improve wireless communication quality.

In this second embodiment, an example is explained in which the UL subframe is divided into two regions (the R3 region and the R1 region). Similar execution is possible in cases of division into three, four, or another number of regions as well. In these cases, UL subchannel allocation information, and information indicating whether to execute subchannel rotation or not, is stored, corresponding to each of the divided region, in the storage unit 1130. The base station 100 transmits an UCD message including these information.

Other Embodiments

In the above first and second embodiments, examples are explained for the UL direction, from the mobile station 200 to the base station 100. When DL subframe is divided into regions in the frequency axis direction similarly to UL subframe, application similarly to the first and second embodiments is possible for the DL direction as well. In this case, the base station 100 transmits DCD messages or similar including DL subframe allocation information and similar to the mobile station 200, and the information is output from the control message generation unit 115 to the transmission unit 105. In the transmission unit 105, based on exclusively set physical subchannel and similar, PUSC and data subchannel rotation are executed.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

The invention claimed is:

1. A wireless communication method for performing wireless communication between a first communication apparatus and a second or third communication apparatus, the wireless communication method comprising:

allocating a first subchannel in a first frequency region of a wireless frame to the second communication apparatus, when the second communication apparatus performs a first communication, and allocating a second subchannel in a second frequency region of the wireless frame to the third communication apparatus, when the third communication apparatus performs a second communication, by the first communication apparatus; and changing physical subchannels included in a logical subchannel within the first frequency region in each slot and performing transmission, when the first subchannel is allocated to the second communication apparatus, and changing physical subchannels included in the logical subchannel within the second frequency region in each slot and performing transmission, when the second subchannel is allocated to the third communication apparatus, by the first communication apparatus, wherein the first frequency region and the second frequency region are set so as not to have frequency overlap.

2. The wireless communication method according to claim 1, wherein
the first communication and the second communication are communication performed according to orthogonal frequency division multiplexing, and
a length of symbol transmitted in the first communication is different from a length of symbol transmitted in the second communication.

3. The wireless communication method according to claim 1, wherein
the first communication and the second communication are communication performed according to a orthogonal frequency division multiplex method,
the first frequency region includes a frequency used in wireless communication performed by other communication apparatus adjacent to the first communication apparatus, when the first communication is performed, and
the second frequency region is set so as not to include the frequency used in wireless communication performed by the other communication apparatus adjacent to the first communication apparatus, when the second communication is performed.

4. A communication apparatus for performing wireless communication with another communication apparatus, the communication apparatus comprising:
an allocation unit which allocates a first subchannel in a first frequency region of a wireless frame to the other communication apparatus, when the second other communication apparatus performs a first communication, and allocates a second subchannel in a second frequency region of the wireless frame to the other communication apparatus, when the other communication apparatus performs a second communication; and,
a reception unit which receives transmission performed by which the other communication apparatus to which the first subchannel is allocated changes physical subchannels included in a logical subchannel within the first frequency region in each slot, and receives transmission performed by which the other communication apparatus to which the second subchannel is allocated changes physical subchannels included in the logical subchannel within the second frequency region in each slot.

5. The communication apparatus according to claim 4, wherein the communication apparatus corresponds to a base station, and the other communication apparatus corresponds to a mobile station.

6. A communication apparatus for performing a wireless communication with another communication apparatus, the communication apparatus comprising:
a reception unit which receives first subchannel allocation information within a first frequency region of a wireless frame from the other communication apparatus, when the communication apparatus performs a first communication, and receives second subchannel allocation information within a second frequency region of the wireless frame from the other communication apparatus, when the communication apparatus performs a second communication; and
a transmission unit which changes physical subchannels included in a logical subchannel within the first frequency region in each slot and performs transmission, when the first subchannel is allocated, and changes physical subchannels included in the logical subchannel within the second frequency region in each slot and performs transmission, when the second subchannel is allocated.

7. The communication apparatus according to claim 6, wherein the other communication apparatus corresponds to a base station, and the communication apparatus corresponds to a mobile station.

* * * * *